(12) United States Patent
Henoch

(10) Patent No.: US 8,032,435 B2
(45) Date of Patent: Oct. 4, 2011

(54) SECURE TRANSMISSION OF MONEY TRANSFERS

(75) Inventor: Bengt Henoch, Huskvarna (SE)

(73) Assignee: Diasporalink AB, Jonkoping (SE)

( * ) Notice: Subject to any disclaimer, the term of this patent is extended or adjusted under 35 U.S.C. 154(b) by 466 days.

(21) Appl. No.: 12/314,964

(22) Filed: Dec. 19, 2008

(65) Prior Publication Data

US 2009/0164367 A1 Jun. 25, 2009

Related U.S. Application Data

(60) Provisional application No. 61/071,920, filed on May 27, 2008.

(30) Foreign Application Priority Data

Dec. 21, 2007 (SE) ...................................... 0702877

(51) Int. Cl.
*G06Q 40/00* (2006.01)
(52) U.S. Cl. ................ 705/35; 705/37; 705/44
(58) Field of Classification Search ............... 705/35, 705/37, 44
See application file for complete search history.

(56) References Cited

FOREIGN PATENT DOCUMENTS
WO    WO 96/33476    10/1996

OTHER PUBLICATIONS

Money in electronic commerce: Digital cash, electronic fund transfer, and Ecash; Panurach, Patiwat Communications of the ACM; v39n6; pp. 45-50; Jun. 1996.*

* cited by examiner

*Primary Examiner* — Richard C Weisberger
(74) *Attorney, Agent, or Firm* — Harness, Dickey & Pierce, P.L.C.

(57) ABSTRACT

The invention relates to a method and a device for enabling a validated money transfer between a sending and a receiving person via a sending and a receiving financial institution, where a request to a validation agent for validation of a money transfer replaces normal time consuming cross border security checks. The validation agent, being unaffiliated with the sending financial institution and the receiving financial institution, administers a data base comprising validated transfer agreements, which agreements specifies at least the identity of a sending person and of a receiving person. A validation of a transfer is executed at the validation agent by comparing current transfer data with information specified in the validated transfer agreements.

22 Claims, 2 Drawing Sheets

SECURE TRANSMISSION OF MONEY TRANSFERS

CROSS-REFERENCE TO RELATED APPLICATIONS

This application claims priority under 35 U.S.C. §119 to, U.S. application Ser. No. 61/071,920, filed May 27, 2008, and further claims priority under 35 U.S.C. §119 to Swedish Application No. 0702877-2, filed Dec. 21, 2007, in the Swedish Intellectual Property Office.

TECHNICAL FIELD OF THE INVENTION

The invention relates to a method, and a device for validated money transfer, and more specifically to a money transfer performed via an International Banking Network.

BACKGROUND ART

In order to combat money laundering and terrorist financing the intergovernmental body FATF (Financial Action Task Force on Money Laundering) was founded by G7 in 1989. The primary policies issued by the FATF are the Forty Recommendations on money laundering and the Special Recommendations on Terrorist Financing. Related to these is e.g. the Know Your Customer (KYC) due diligence that financial institutions and other regulated companies must perform to identify their clients and ascertain relevant information pertinent to doing financial business with them.

Although improving security issues, requirements in line with the KYC regulations have increased costs and reduced speed especially for cross-border transfer of money, as for each transaction an elaborate scheme of validating sender and receiver relative to identity, address and legal history as well as validating senders and receivers accounts and monitoring the regularity and irregularity of the transfer patterns needs to be performed.

In more detail, one reason why the scheme is time consuming is that a number of requests and confirmations have to be exchanged between the sending and the receiving bank. Further, a consecutive request from the sending bank is normally not sent until a previous one has been confirmed. When the transfer is performed electronically or by electronic means, the first request normally concerns whether the receivers account exist at the receiving bank and if the account may receive money from the sending account. Provided this is confirmed, the funds are transferred to an institution in an International Banking Network before this institution delivers it to the receiving bank. After this has been validly performed, a confirmation that the funds have been received is sent to the sending bank from the receiving bank. The messaging between the sending and receiving banks is normally performed using a communication protocol provided by Society for Worldwide Interbank Financial Telecommunication (SWIFT). There are instances where the receiving bank only empties its batch of incoming request once a day, and sends the confirmations with the same periodicity. Thus the time from initiation until a money transfer has been completed might amount to days.

In summary, the execution of this validation scheme at every transaction is connected with costs and delays, especially when passing country borders and time zones.

SUMMARY OF THE INVENTION

The object of the invention is to eliminate or at least alleviate the above mentioned drawbacks especially related to current cross-border money transfers between different countries, and preferably to provide money transfer which is more reliable, faster, cheaper and/or more secure.

The invention is based on a realisation of the inventor that the above objects may be achieved by collecting validated transfer agreements in a database hosted or administered by a specified instance; wherein the transfer agreements preferably specifies the identity of a sending person, the identity of a receiving person, financial means associated with said first person and financial means associated with said second person; such that when e.g. a sending bank is to transfer money from said first to said second person via a receiving bank, the extensive security checks which are normally performed by said sending and receiving banks, respectively, are replaced by a simple request for confirmation from said specified instance that the request to transfer a sum between the sending person to the receiving person via said first and second financial means is valid, i.e. in line with international money transferring policies and banking regulations such as KYC.

The invention is also based on that the collection of validated transfer agreements connecting a pair of one sender and one receiver is stored in a data base comprising security related data, that e.g. comprises the security data bases of more than one bank or financial institution. Information on by which regularity remittances are received are e.g. also stored in a data base. This information may be used as a form of credit rating and contains information on the geographic pattern of remittance into a region, which is a base for targeted information or marketing.

According to a first aspect thereof, the invention relates to a method of making a validated money transfer, utilizing a sending financial institution, a receiving financial institution, and a validating agent unaffiliated with both said receiving financial institution and sending financial institution, comprising the steps of:

(a) providing a database comprising validated transfer agreements, which database is administered by said validating agent, each agreement comprising:
  identity of said transfer agreement;
  identity of a sending person associated with said transfer agreement;
  identity of a receiving person associated with said transfer agreement;
  identification of a first money transfer method via which money is provided from said sending person to said sending financial institution;
  identification of a second money transfer method via which money is received by said at least one receiving person from said receiving financial institution;
(b) receiving a validation request at said validation agent, wherein said request contains transfer data specifying the identity of a transfer agreement, a first money storing means or first money holder, a second money storing means or second money holder, the identity of a sending person, and the identity of a receiving person;
(c) executing a validation at said validation agent by comparing said transfer data with data of said transfer agreement comprised in said data base;
(e) sending information from said validation agent to said sending financial institution specifying that a money transfer in accordance with the transfer data is valid;
(g) transferring an amount of money from said sending person to said receiving person via said sending and receiving financial institutions and said first and second money transfer methods.

According to one embodiment said step of transferring an amount of money further comprises the steps of:

first providing said amount from said first money storing means or first money holder to said sending financial institution via said first money transfer method;

thereafter providing said amount from sending financial institution to said receiving financial institution via an International Banking Network; and finally providing said amount from said sending financial institution to said second money storing means or second money holder via said second money transfer method.

According to a second aspect thereof, the invention relates to a device or validator for providing an validated money transfer comprising:

a communicator or means for communicating with a sending financial institution and a receiving financial institution via an International Banking Network;

a database comprising data regarding transfer agreements (500) specifying:
   identity of a sending person (100);
   identity of a receiving person (200);
   identification of first money storing means (150) or money holderholder associated with said sending person;
   identification of second money storing means or money holderholder (250) associated with said receiving person;
   periodicity at which transfers are to be made;
   maximum sum of transfer;

a receiver or means for receiving a validation request, which request comprises transferring data specifying a sending person, a transfer agreement and an amount to be transferred from a first money storing means to a second money storing means;

an executor or means for executing a validation by comparing said transferring data to said transfer agreement;

a sender or means for sending a confirmation from said validator to said sending financial institution confirming that the transfer data is valid with respect to said transfer agreement.

An advantage associated with the above aspects of the invention is that the security checks inferred by e.g. banking regulations may be performed by the sending bank without communicating with said receiving bank. Thus, the security checks may be performed also when normal means of communication with said receiving bank is interrupted due to e.g. failure in the internet communication. Further, the security checks are not affected by the frequency of emptying and responding to a batch request provided by the sending bank. Additionally, the security checks are not inflicted by the administrative routines at said receiving bank. Moreover, relieving the banks of the administration associated with performing security checks for each money transfer, facilitates the cutting of administrative costs.

The above advantages are especially noticeable when administrating funds from migrant workers back to their home country. Remittances have normally a high transaction cost relative to the often low incomes of migrant worker, who many times do not speak the local language and do not have the necessary documentation. In other word, they may have difficulties finding access to international money transferring networks. Often the services are unreliable, particularly concerning the time taken for the funds to be transferred, which can be an incitement for the development of a grey remittance market. In addition some markets are uncompetitive or have regulatory barrier to the provision of remittance services. Further the underdeveloped financial infrastructure in some countries makes it difficult for recipients to collect the remittances.

In this document the term "financial institution" refers to any instance having the capacity of receiving an order of transferring money from a first person to a second person. Examples of financial institutions are Banks, Bank Agencies, Payment Service Providers, and Micro Finance Institutes.

In this document the term "validated money transfer" refers to a money transfer wherein the sending person and the receiving person have been verified in accordance with current banking regulations such as e.g. Know Your Client.

In this document the term "validated transfer agreement" refer to an agreement between a sending person and a validating agent or a sending financial institution, that specifies a money transfer which is to be made between a sending person and a receiving person, normally at regular intervals, which money transfer has been verified to be in accordance with current banking and financial regulations such as e.g. Know your Client.

The database is not necessarily located at the same physical location as the validation agent, but may be connected to the agent via suitable data links such as the internet.

In this document a distinction is made between on the one hand an internal security data base being used by one or several affiliated banks, which database comprises primarily activities in and out of bank accounts belonging to the affiliated banks; and on the other hand a data base according to the invention which is administered by a validation agent unaffiliated with the clients requesting its services, this data base combines e.g. data elements from several unaffiliated banks' data bases and serves to validate the regular remittance flow between a contracted pairs of sender/receiver.

In this document the term "money holderholder" or "money storing means" refers to any means by which money can be held, e.g. bank accounts, credit cards, prepaid cards such as loadable prepaid credit cards, cheques, bank-notes etc.

According to one example the sending person first contacts the transfer agent, either directly or via a sending financial institution. At this contact the sending person signs a sender contract with the financial institution and/or the transfer agent, which contract specifies the identity of both the sending and receiving person. The transfer agreement may also state which amounts and at which intervals money is intended to be transferred. The sender is usually not bound by these intentions, but a monitoring service may be provided which reports substantial deviations from these intentions.

After the validation agent has verified or validated that the transfer agreement data is in line with banking regulations and especially cross boarder banking regulations, said identities together with optional additional data associated with the transfer is stored as a transfer agreement in a database administered by the validation agent. The transfer agreement states e.g. by which means money is to be transferred from said sending to said receiving person. Further, the transfer agreement is associated with a reference or identity, by means of which the sending person or data program may refer to it in order to initiate a transfer. Moreover, the way of transfer may be enabled by distributing a e.g. prepaid card to the sending person.

When a transfer is to be made the sending person or a sending financial institution contacts the validating agent, and request a validation of a transfer as defined by transfer data. The validation is executed by said validating agent by a comparison of said transfer data with said validated transfer agreement. Provided that the transfer data is in line with the transfer agreement the validating agent informs said sending financial institution that a transfer in accordance with said transfer data may be made.

Thereafter, the sending financial institution executes the transfer of money from said sending person to said receiving person, and the sending person and the receiving person are notified of the transfer.

According to one embodiment the data specifying the identity of a person may comprise data selected from a group containing full name, address, identity documentation, telephone number and e-mail address associated with said person and combinations thereof.

According to one embodiment said transfer agreement data further comprises data specifying by which means a transfer may be initiated by said sending person, such as via a web-site, by an SMS, by a letter, by fax, by telephone and combinations thereof.

According to one embodiment said transfer agreement data further specifies by which means of communication the transfer is to be made between said first money storing means and the second money storing means.

According to one embodiment said transfer agreement data further specifies by which communication means or by which ways of communication said receiving person is to be notified about the transfer, such as via SMS, e-mail, web-site notification, telephone, letter and combinations thereof. An instruction for money transfer may also be received via an Automatic Teller Machine, a Point of Sales or a Card Enabled Mobile Phone, which is advantageous as the validation agent may then be interoperable with different systems serving remote or neglected geographical areas.

According to one embodiment the validation agent provides at least one of the following: a web-site which provides fill in forms to the sending person and support for signing, changing and verifying or validating a sender contract and a transfer agreement; a message service for initiating possible prepaid cards associated with the transfer agreement; a user interface served by SMS, e-mail or web-site for initiating a transfer using the identity of the transfer agreement; an operative database storing and fetching the data needed for the on-line services, i.e. the execution of validation requests; a data warehouse for storing data from the operative database and make them searchable for additional services; a search engine which can selectively search and compile data stored in the operative data base and the data warehouse; a password secured web-site user interface supplying, with support from the search engine, additional services to legitimate and certified clients; and an Application Program Interface communicating with the sending financial institution for verification, order and report on transfer statistics, etc.

According to one embodiment said step of executing a validation at said validation agent further comprises the step of storing assignment data, wherein said assignment data may be selected from a group comprising current date, current sum to transfer, address of the current receiving person, address of the current sending person, the country or region the transfer is made to and from, respectively etc and combinations thereof. A record of a sending persons transfer agreements and executed transfers during a first time period can be the base for a bonus system or personalized offers. The assignment data may be stored in a data base different from the one wherein the transfer agreement data is stored, such that the assignment data may be selectively searched by e.g. a search engine without affecting the operable database.

A record of a receiving persons transfers from one or several senders can be used for credit rating, especially when showing sustainability over time. This may e.g. by used by a sender searching microloans or person-to-person microcredits. Persons or organisations interested in information summering transfers received by different persons may e.g. be micro finance institutes and other microcredit suppliers.

Addresses of senders that transfer money into a particular region may be used for sending selective information to these senders on individual credit requests, regional investment opportunities and regional development projects.

Data on transfer streams between a sending region and a receiving region can be used for regional development planning and other development policies.

According to one embodiment the senders transfer agreements and transfers over a time period is the base for a transfer fee policy based on accumulated transfers. In other words, those who transfer money often or transfer large amounts may enjoy a "frequent" sender bonus.

According to one embodiment the validation agent administers both an operative database, wherein the data needed for the execution of validation requests is stored, as well as a second data base or data warehouse wherein data from the operative database is stored. Further, the data warehouse may contain a list of sending persons and their respective residence address and transfer target address. Both the sending and receiving addresses may be regionally coded, making it possible to extract an address list of senders transferring money into a particular geographical region. This address list may further be used for sending selective information to senders with individual credit requests, regional investment opportunities and regional development projects.

According to one embodiment the two databases contain data on the transfer streams between a sending region and a receiving region, which may be used for regional development planning and other development policies.

According to one embodiment said step of receiving transfer data at said sending financial institution comprises receiving said data by means of e-banking or m-banking. E-banking is e.g. supported by bank cards communicating via a solid Automatic Teller Machines/Point of Sales infrastructure and different forms of e-banking via internet and telephone for transfers between accounts.

M-banking can be understood as different financial services based on mobility, normally provided by mobile phones, and includes transfer between accounts, mobile Point of Sales and phones as carriers of accounts (air time or e-purse). Some systems such as SMART and G-CASH combine mobile transfer of money with card access. M-banking can normally be seen as a sub-division of e-banking. M-banking can be supported by different types of card readers that are connected to mobile communication devices, used e.g. by Banco do Braxil for remittance sending and distribution in rural areas and local economies.

According to one embodiment the sending financial institution receives the transfer data from a system serving remote or neglected areas, such as networks of low cost Point of Sales, Automatic Teller Machines, Card Enabled Mobile Phones and/or Bank Agents. Further, the receiving person may receive the transferred amount via e.g. one of these systems. In other words the method of validated money transfer is, for example, interoperable with such systems.

Moreover, the transfer agreement data may further comprise biometric identification data, such that smart bank cards using biometric identification may be used as identification by the sending and/or receiving person. Further, the transfer agreement data may optionally comprise general identity card numbers and/or health card numbers.

In other words there is provided a remittance service that is built on direct transfer person to person, which meets the security and KYC regulations by establishing contracted links that define sender and receiver and transfer patterns. By using contracted links the transfers can be initiated by simple commands using e.g. mobile telephones or internet.

The concept of contracted links implies usually a data base containing addresses of senders and a record of made transactions and this can subject to the consensus of the individual be used for additional services:

the sender can use a "frequent sender" policy to minimize his fees;

the transfer account of the receiver can be used for credit rating in the receivers contact with credit providers;

the data base can generate an address list (e-mail, mobile phone etc) of senders, who send money into a particular region and this list can be used for sending information from the region concerning investments, development projects, starting or expanding micro-enterprises, etc and be used for forming "virtual township associations".

In essence, the invention relates to methods and devices enabling a validated money transfer from a sending person to a receiving person, wherein said step of validating said transfer lacks the step of sending an validation request, containing data about said second money storing means or money holder, directly from said sending financial institution to said receiving financial institution.

The gist of the invention is to enable a validated money transfer between a sending and a receiving person via a sending and a receiving financial institution, where a request to a validation agent for validation of a money transfer replaces normal time consuming cross border security checks. The validation agent, being unaffiliated with said sending financial institution and said receiving financial institution, administers a data base comprising validated transfer agreements, which agreements specifies at least the identity of a sending person and of a receiving person. A validation of a transfer is executed at said validation agent by comparing current transfer data with information specified in said validated transfer agreements.

Further objects, features and advantages associated with the present invention will become apparent when studying the following detailed disclosure, the drawings and the appended claims. Those skilled in the art realise that different features of the present invention can be combined to create embodiments other than those described herein.

DETAILED DESCRIPTION OF PREFERRED EMBODIMENTS OF THE INVENTION

Figure 1:
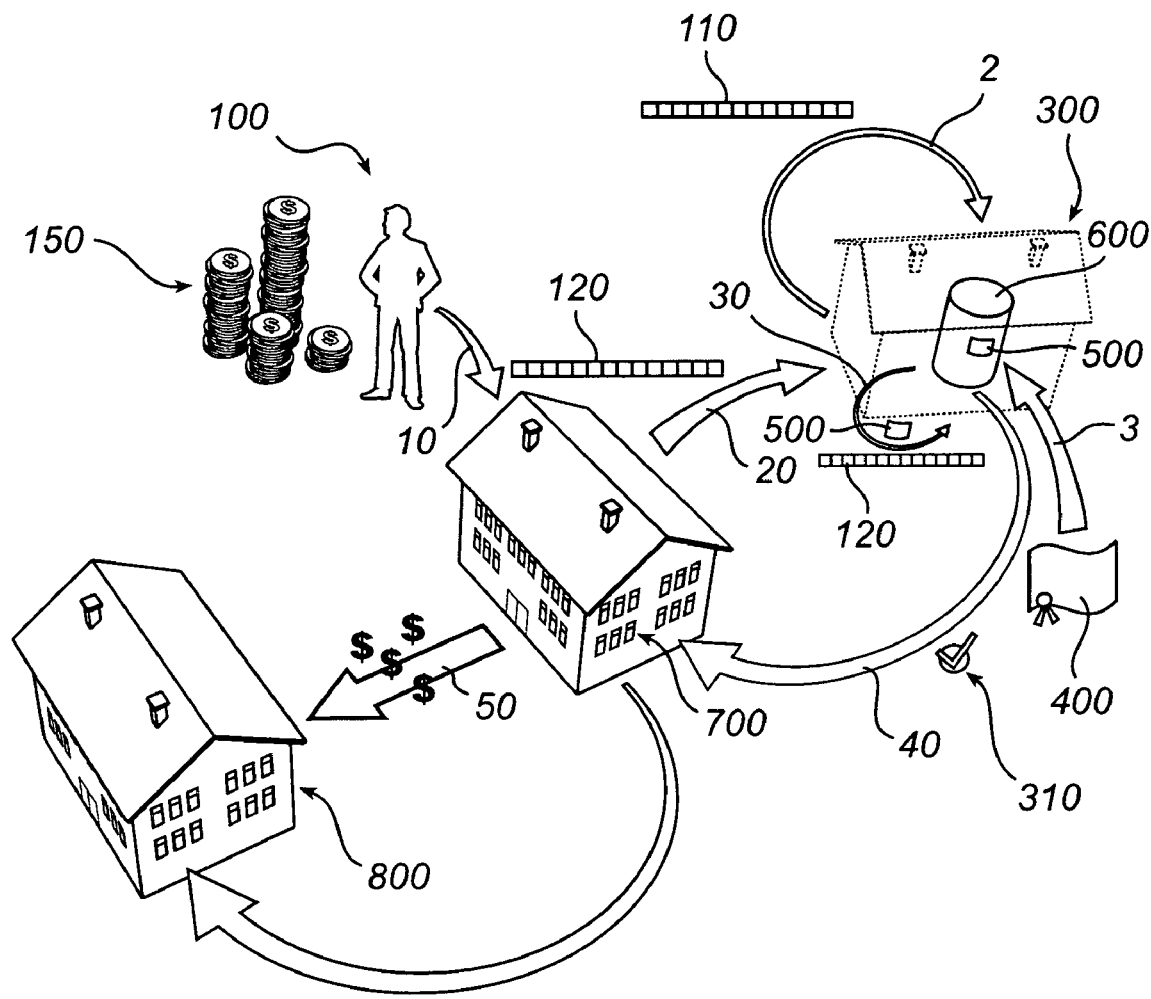
FIG. 1 illustrates a method of validated money transfer from a sending person to a receiving person.
Figure 1:
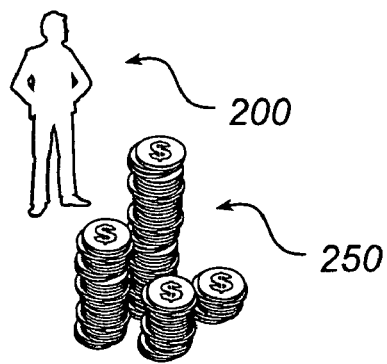

With reference to FIG. 1, a first person or a sending person 100 who wants to transfer money to another person, i.e. a receiving person 200, first contacts an validating agent or authenticating institution 300 in order to create and validate a transfer agreement 400. The contact 1 can be made directly, i.e. a personal contact with somebody working at the authentication institution, or e.g. via a web-site, e-mail, fax or telephone. The contact can also be made indirectly via a e.g. financial institution cooperating with the validating institution. The financial institution may contact the validating institution by any means such as for example telephone, fax, e-mail or via a web-site.

At the contact 1 with the validating institution 300 the sending person 100 provides data 110 comprising identifying personal information about himself, such as e.g. full name and address, social security numbers, telephone number or a selection of these data. The data 110 also comprises identifying personal information about a receiving person, such that the validating institution is able to perform security checks with respect to the sending and receiving person as required by e.g. banking regulations. For example, the data 110 may also comprises information regarding recommended intervals of transfer and a recommended limit for sums to be transferred. After having received said data 110 the validating institution performs a validation or security check 2 with respect to said transfer. Provided that the security check or security validation 2 results in that the sender 100 is allowed to transfer money to the receiving person 200, a transfer agreement 400 is established, specifying the identity of the sending person the identity of the receiving person and, for example, also specifying a recommended limit of money to transfer and a recommended interval at which money is to be transferred from said sending to said receiving person. Data 500 regarding the transfer agreement 400, e.g. identity of the sending person, receiving person and possibly intervals at which transfers are intended to be made and a maximum sum to transfer, is stored 3 in a database 600 held by the validating institution 300.

According to a first embodiment, the transfer agreement data 500 may specify more than one receiving person. Alternatively, two transfer agreements may be stored in said data base 600, both comprising data identifying the same sending person 100 and each comprising data identifying a different receiving person. According to one embodiment each specific transfer agreement between one sender and one receiver is given a specific link ID, which is used for initiating a transfer in the specific link using e.g. mobile phones or internet.

According to one embodiment all communication between the validating institution and the sending person and/or between the sending person and the sending financial institution is performed via a web-site, e-mail and/or SMS. According to one example the user interacts with the validation institution and/or sending financial institution by sending encrypted messages to a web-site user interface.

According to one example, when the sender or sending person 100 initiates a money transfer to a receiving person he provides 10 a sending financial institution 700 with transfer data 120, specifying e.g. his identity (i.e. the identity of the sending person 100), identity of a receiving person 200, reference to a transfer agreement 400, and optionally an amount to be transferred from a sending money storing means 150 associated with said sending person, to a receiving money storing means 250. The transfer data 120 may be provided to the sending financial institution via a number of means, such as via a web-site, fax, telephone, e-mail, SMS and/or manually normally without electronic means.

When a sending financial institution 700 receives a request 10 for money transfer and data comprising 120 a reference to a transfer agreement, it starts by requesting 20 validation of the transfer from the validating institution 300. In other words a validation request 20 is sent from said financial institution 700 to a validating institution 300, which validation request 20 contains said transfer data 120.

Alternatively, when the sender or sending person 100 initiates a money transfer to a receiving person he provides said transfer data directly to said validation agent 300, which transfer data specifies e.g. his identity (i.e. the identity of the sending person 100), identity of a receiving person 200, reference to a transfer agreement 400, and optionally an amount to be transferred from a sending money storing means 150 associated with said sending person, to a receiving money storing means 250. The transfer data may be provided to the validation agent via a number of means, such as via a website, fax, telephone, e-mail, SMS and/or manually normally without electronic means.

A validator at the validating institution 300 compares the received transfer data 120 to the transfer agreement data 500 in order to ensure that said data 120 is in line therewith. A validation 30 may e.g. be performed by verifying that the data 500 corresponding to the transfer agreement 400 is present in the data base 600; that the transfer data 120, concerning the identity of the sending person and the receiving person, corresponds to the transfer agreement data 500 stored in the database; and that other transfer data 120 corresponds to information 500 contained in the data base with respect to the transfer agreement 400.

According to one embodiment the validator invalidates a transfer if a the sum to be transferred is not within a recommended interval, if the transfer agreement is not identified, if the identity of the sending person does not correspond to the transfer agreement etc.

According to one embodiment the validator monitors that the amount or sum to be transferred does not deviate too much from the transfer pattern provided by the sending person. The sending person may for example give a recommended or intended minimum and/or maximum sum of money to be transferred and/or a periodicity at which the transfers are to be made. For example, when comparing the transfer data to transfer agreement data comprising a recommended or intended transfer interval or transfer periodicity, the validator validates a transfer also when the sum to be transferred is slightly outside the recommended interval. But the transfer is invalidated if the sum to be transferred exceeds the recommended interval by a predetermined amount, e.g. by 50% or 20% or 10% of the intended sum. The transfer may also be invalidated if the accumulated sum which has been transferred to the receiving person during a predetermined period exceeds a certain amount, e.g. exceeds 50% or 20%בלthe recommended periodicity'×'predetermined time period'× 'recommended maximum sum to transfer each time'.

If the request for validation was received from a sending financial institution, and the transfer data 120 is invalidated by the validator, a negative confirmation may be sent to the sending financial institution 700, and the transfer is interrupted.

If the request for validation was received from said sending person, and the transfer data 120 is invalidated by the validator, a negative confirmation may be sent to the sending person, and the transfer is interrupted.

Provided that the transfer data 120 is in line with the transfer agreement data 500, which is stored in the database 600 at the validator 300, the validator 300 sends 40 a message 310 to the sending financial institution 700 that the transfer data is valid. If the request for validation was received from the sending person, relevant transfer data is forwarded to the sending financial institution.

By receiving a message 40 from the validator 300 the sending financial institution 700 is informed that the money transfer between the sending money storing means 150 and the receiving money storing means 250 is valid with respect to banking regulations.

After having received 40 this message 310 the sending financial institution 700 transfers 50 the relevant amount from said sending money storing means 150 to said receiving money storing means 250 via an International Banking Network. According to one embodiment the money is transferred 40 to said receiving money storing means via a receiving financial institution 800.

The money can be provided from said sending person 100 to said sending financial institution 700 in a wide variety of forms, by means of cash, as a cheque, from a bank account, via a credit card, via a prepaid card etc.

Similarly, the money can be provided to said receiving person 200 in a wide variety of forms, such as by means of cash, as a cheque, to a bank account, via a credit card, via a prepaid card etc.

According to one embodiment additional information about the transfer agreement is stored in the data base. This information may concern additional personal information about the sender or receiver, such as their e-mail addresses or their mobile telephone numbers, ways in which the receiver is notified that a money transfer has been completed, ways in which the money transfer may be initiated by the sending person, possible credit etc.

According to one example, the validating institution also register information about the transactions it is asked to validate. This information can later be used to provide credit rating information, bonus programs.

While the invention has been illustrated and described in detail in the drawing and foregoing description, such illustration and description are to be considered illustrative or exemplary and not restrictive; the invention is not limited to the disclosed embodiments.

For example, it is possible to operate the invention in an embodiment wherein some transfer data is not provided by the sending person, but provided by the sending financial institution. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to an advantage. A computer program or a data base may be stored/distributed on a suitable medium, such as an optical holder medium or a solid-state medium supplied together with or as part of other hardware, but may also be distributed in other forms, such as via the Internet or other wired or wireless telecommunication systems.

Figure 2:
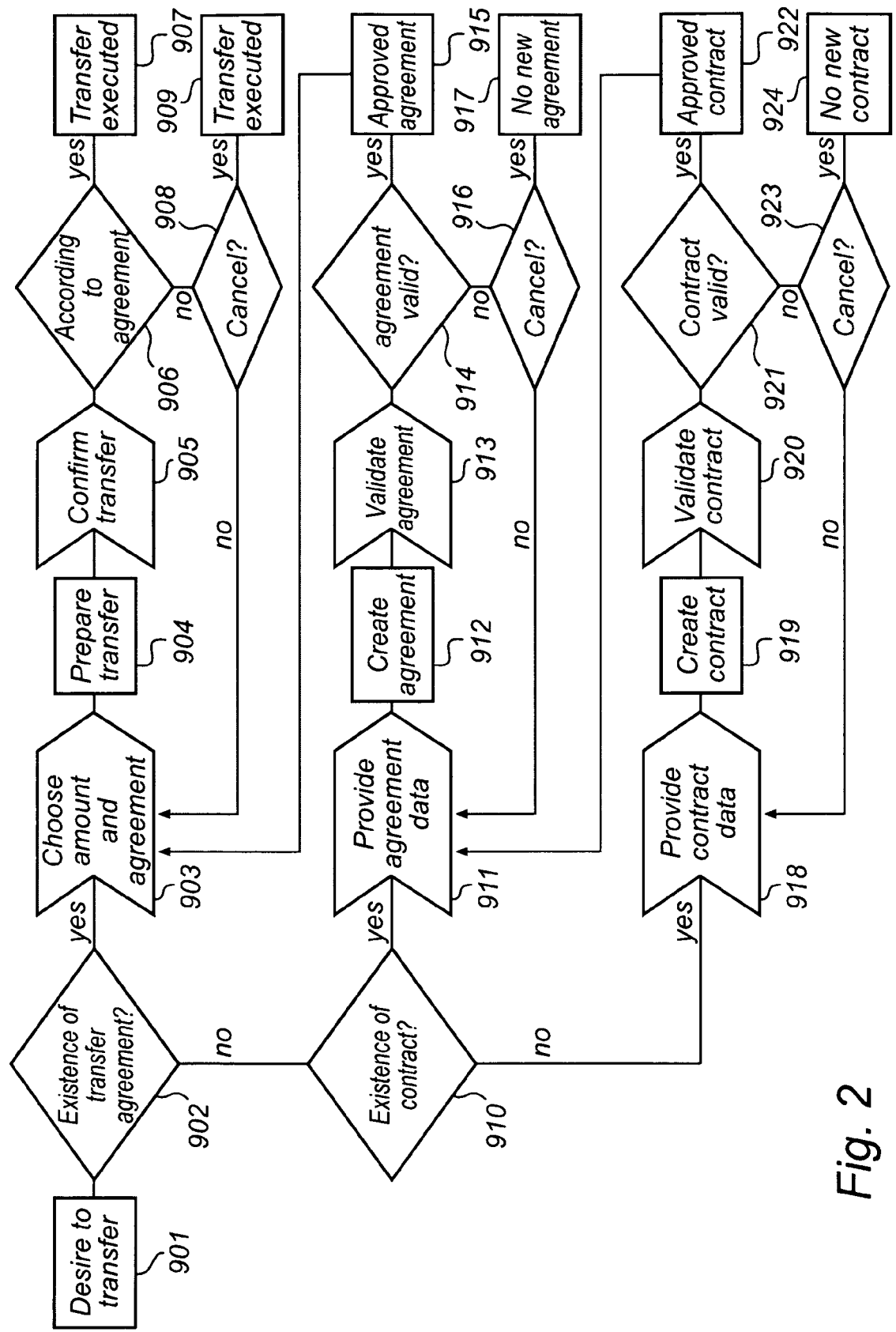
FIG. 2 illustrates one example of which steps that can be performed before a transfer is completed.

FIG. 2 illustrates one example of which steps that can be performed before a transfer is completed. This is merely an example, and substantially the same result can be achieved even if all steps are not carried out. The process is caused by a need or intention 901 of a first person to transfer money to a second person. In step 902 a check is made if there exist one or several transfer agreements between the first person and the validating agent. Provided that the transfer agreement exists the first person indicates, step 903, which transfer agreement he would like to use, i.e. to whom and in which way the transfer is to be made, and also the amount of money to be transferred. In step 904 the transfer is initiated and in step 905 the first person confirms that he would like to make the transfer. After the confirmation 905 a check, step 906, is made that the transfer agrees with the transfer agreement, with respect to e.g. amount and periodicity. Provided that the outcome is positive, the transfer is performed step 907. If the outcome of the check in step 906 is negative, the first person is asked, in step 908, whether he would like to cancel the transfer or if he wants to continue. If he decides to cancel the transfer is interrupted, step 909. If he decides to continue, the process repeats step 903 and the user is asked to indicate a transfer agreement and a sum to transfer.

On the other hand, if the check in step 902 results in a determination that no transfer agreement exists, the process checks, in step 910, if there exists a contract between said first person and said validating agent. Such a contract permits or enables the first person to create one or several new transfer agreements. Provided that the contract exists, the first person is asked, in step 911, to furnish the necessary data such that a new transfer agreement to be created. In step 913 the agreement is validated. In step 914 the result of the validation is checked. Provided that the outcome of the check is positive, in step 915, the process continues with step 903. If the outcome, in step 914, is negative the first person is asked if he wants to cancel the process, step 916. If the answer is affirmative, the creation of a new transfer agreement is interrupted, step 917. If the first person instead wants to continue, the process repeats step 911.

Finally, if the check in step 910 determines that no contract exists, the process initiates a creation of a new contract, step 918. A new contract may specify in which way(s) the sender shall administer the transfers (e.g. internet, SMS and/or manually), and in which way(s) the sender shall be informed that a transfer has taken place (e.g. by mail, SMS and/or e-mail). After the first person has provided the necessary information, the contract is created. In the next step 920 the contract is verified. If the result of the verification step 921 is positive, the contract is registered and ready to use, step 922. If the result of the verification, step 921, instead is negative the first person is asked whether he would like to cancel the process of registering a new contract. Provided the answer from the first person is positive, the process is cancelled, step 924. If the answer instead is negative, the process continues to step 918.

The invention claimed is:

1. A method of making a validated money transfer, utilizing a sending financial institution, a receiving financial institution, and a validating agent unaffiliated with both said receiving financial institution and sending financial institution, comprising the steps of:
    (a) providing a database comprising validated transfer agreements, which database is administered by said validating agent, each agreement comprising:
        identity of said transfer agreement;
        identity of a sending person associated with said transfer agreement;
        identity a receiving person associated with said transfer agreement;
        identification of a first money transfer method via which money is provided from said sending person to said sending financial institution;
        identification of a second money transfer method via which money is received by said at least one receiving person from said receiving financial institution;
    (b) receiving a validation request at said validation agent, wherein said request contains transfer data specifying the identity of a transfer agreement, a first money holder, a second money holder, the identity of a sending person, and the identity of a receiving person;
    (c) executing a validation at said validation agent by comparing said transfer data with data of said transfer agreement comprised in said data base;
    (e) sending information from said validation agent to said sending financial institution specifying that a money transfer in accordance with the transfer data is valid;
    (g) transferring an amount of money from said sending person to said receiving person via said sending and receiving financial instituions and said first and second money transfer methods.

2. A method according to claim 1, wherein
    said validated transfer agreement further comprises a specification of maximum sum of transfer;
    said transfer data further comprises an amount to be transferred from said sending person to said receiving person;
    said step of executing a validation further comprises comparing said amount to be transferred to said maximum sum of transfer and verifying that the amount is valid; and
    said step of transferring money further comprises transferring said amount from said sending person to said receiving person.

3. A method according to claim 1, wherein
    said validated transfer agreement further comprises a transfer periodicity;
    said transfer data further comprises transfer history of at least one of any previous transfers; and
    said step of executing a validation further comprises comparing said transfer history to said transfer periodicity and verifying that the transfer is valid.

4. A method according to claim 1, wherein said step of transferring money further comprises the step of:
    first providing said amount from said first money holder to said sending financial institution via said first money transfer method;
    thereafter providing said amount from sending financial institution to said receiving financial institution via an International Banking Network; and
    finally providing said amount from said sending financial institution to said second money holder via said second money transfer method.

5. A method according to claim 1, wherein said step of receiving transfer data comprises receiving said data from said sending person, preferably by means of e-banking or m-banking.

6. A method according to claim 5, wherein said transfer data is received form at least one of a Point of Sales, an Automatic Teller Machine, a Card Enabled Mobile Phone and a Bank Agent.

7. A method according to claim 1, wherein said step of receiving transfer data comprises receiving said data from a sending financial institution.

8. A method according to claim 7, wherein said sending financial institution receives said transfer data from at least one of a Point of Sales, an Automatic Teller Machine, a Card Enabled Mobile Phone and a Bank Agent.

9. A method according to claim 1, wherein said step of transferring said amount from said sending person to said receiving person lacks the step of sending an validation request, containing data about said second money holder, from said sending bank to said receiving bank.

10. A method according to claim 1, wherein at least one of said financial institutions is selected from a group comprising banks, money transfer agencies, payment service providers and micro finance institutes.

11. A method according to claim 1, wherein said identity of a person comprises data corresponding to at least one of: the full name, an address, an identity documentation, a telephone number, biometrical information, a social security number and an e-mail address associated with said person.

12. A method according to claim 1, wherein said transfer agreement data further comprises data specifying by which means a transfer may be initiated by said sending person.

13. A method according to claim 10, wherein said means by which a transfer may be initiated comprises via a web-site, by SMS, by letter, by fax, by telephone and combinations thereof.

14. A method according to claim 1, wherein said transfer agreement data further specifies by which ways of communication said receiving person is to be notified about the transfer.

15. A method according to claim 14, wherein said ways of communication for notifying said receiving person is selected from a group comprising SMS, e-mail, web-site notification, telephone, letter and combinations thereof.

16. A method according to claim 1, wherein said ways of communication is selected from a group comprising bank accounts, bank cards, prepaid cards, cash and combinations thereof.

17. A method according to claim 1, wherein said step of executing a validation at said validator further comprises the step of storing assignment data.

18. A method according to claim 17, wherein said assignment data is selected from a group comprising current date, current sum to transfer, current receiving person, current sending person, current geographical sending region, current geographical receiving region and combinations thereof.

19. A method according to claim 17, further comprising the step of providing information regarding the assignment data to an institution unaffiliated with said validation agent, wherein said information preferably is statistical information.

20. A method according to claim 17, wherein said assignment data is used to form a credit rating for at least one of a sending and receiving person.

21. A method according to claim 19, wherein said assignment data is used to form a credit rating for at least one of a sending and receiving person.

22. An validator for providing an validated money transfer comprising:
   a communicator for communicating with a sending financial institution and a receiving financial institution via an International Banking Network;
   a database comprising data regarding transfer agreements specifying:
      identity of a sending person;
      identity of a receiving person;
      identification of first money holder associated with said sending person;
      identification of second money holder associated with said receiving person;
      periodicity at which transfers are to be made;
      maximum sum of transfer;
   a receiver for receiving a validation request, which request comprises transferring data specifying a sending person, a transfer agreement and an amount to be transferred from a first money holder to a second money holder;
   an executor for for executing a validation by comparing said transferring data to said transfer agreement;
   a sender for sending a confirmation from said validator to said sending financial institution confirming that the transfer data is valid with respect to said transfer agreement.

* * * * *